(12) United States Patent
Takaoka et al.

(10) Patent No.: US 11,384,643 B2
(45) Date of Patent: Jul. 12, 2022

(54) TURBINE BLADE, GAS TURBINE, INTERMEDIATE PRODUCT OF TURBINE BLADE, AND METHOD OF MANUFACTURING TURBINE BLADE

(71) Applicant: Mitsubishi Hitachi Power Systems, Ltd., Kanagawa (JP)

(72) Inventors: Yoshimasa Takaoka, Kanagawa (JP); Shunsuke Torii, Kanagawa (JP); Hidemichi Koyabu, Kanagawa (JP); Saki Matsuo, Kanagawa (JP); Yasuoki Tomita, Kanagawa (JP); Satoshi Hada, Kanagawa (JP); Yoshifumi Okajima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1054 days.

(21) Appl. No.: 15/771,257

(22) PCT Filed: Nov. 4, 2016

(86) PCT No.: PCT/JP2016/082740
§ 371 (c)(1),
(2) Date: Apr. 26, 2018

(87) PCT Pub. No.: WO2017/078122
PCT Pub. Date: May 11, 2017

(65) Prior Publication Data
US 2018/0306037 A1 Oct. 25, 2018

(30) Foreign Application Priority Data

Nov. 5, 2015 (JP) .............................. JP2015-217753

(51) Int. Cl.
*F01D 5/18* (2006.01)
*F01D 9/02* (2006.01)
(Continued)

(52) U.S. Cl.
CPC ............... *F01D 5/187* (2013.01); *F01D 5/18* (2013.01); *F01D 5/181* (2013.01); *F01D 9/02* (2013.01);
(Continued)

(58) Field of Classification Search
CPC . F01D 5/18; F01D 5/181; F01D 5/182; F01D 5/187; F02C 7/18; F05D 2230/21; F05D 2240/12; F05D 2240/301
See application file for complete search history.

(56) References Cited

U.S. PATENT DOCUMENTS 4,297,077 A 10/1981 Durgin et al.
5,624,231 A 4/1997 Ohtomo et al.
(Continued)

FOREIGN PATENT DOCUMENTS

CN 1536200 10/2004
CN 104285038 1/2015
(Continued)

OTHER PUBLICATIONS

Office Action dated Aug. 28, 2019 in corresponding Chinese Patent Application No. 201680063743.0.
(Continued)

*Primary Examiner* — Topaz L. Elliott
*Assistant Examiner* — Aye S Htay
(74) *Attorney, Agent, or Firm* — Wenderoth, Lind & Ponack, L.L.P.

(57) ABSTRACT

A turbine blade, a gas turbine, an intermediate product of the turbine blade, and a method of manufacturing the turbine blade are disclosed. The turbine blade has a blade body having hollow shape, cavities defined inside the blade body, and a cooling passage that opens from the cavities to a rear end portion of the blade body. The cooling passage includes: a first passage on a third cavity side and having a width that
(Continued)

becomes narrower from the third cavity side toward the rear end portion of the blade body; and a second passage on a rear end portion side of the blade body and having a width that is constant from the third cavity side toward the rear end portion of the blade body.

5 Claims, 6 Drawing Sheets

(51) Int. Cl.
 F02C 7/18 (2006.01)
 F02C 7/00 (2006.01)
(52) U.S. Cl.
 CPC ............... F02C 7/00 (2013.01); F02C 7/18 (2013.01); *F05D 2230/21* (2013.01); *F05D 2240/12* (2013.01); *F05D 2240/122* (2013.01); *F05D 2240/301* (2013.01); *F05D 2240/304* (2013.01); *F05D 2260/201* (2013.01)

(56) References Cited

U.S. PATENT DOCUMENTS

| | | | | |
|---|---|---|---|---|
| 5,931,638 | A * | 8/1999 | Krause | F01D 5/186 |
| | | | | 416/97 R |
| 6,234,754 | B1 | 5/2001 | Zelesky et al. | |
| 6,270,317 | B1 * | 8/2001 | Manning | F01D 9/041 |
| | | | | 416/97 R |
| 7,014,424 | B2 | 3/2006 | Cunha et al. | |
| 7,175,386 | B2 * | 2/2007 | Cherolis | F01D 5/187 |
| | | | | 415/115 |
| 7,686,580 | B2 * | 3/2010 | Cunha | F01D 5/186 |
| | | | | 416/97 R |
| 8,070,441 | B1 * | 12/2011 | Liang | F01D 5/187 |
| | | | | 416/97 R |
| 9,175,569 | B2 | 11/2015 | Bergholz, Jr. et al. | |
| 9,366,144 | B2 * | 6/2016 | Zess | F01D 5/187 |
| 2001/0012484 | A1 * | 8/2001 | Beeck | B22D 11/0405 |
| | | | | 416/97 R |
| 2004/0202542 | A1 | 10/2004 | Cunha et al. | |
| 2007/0237639 | A1 | 10/2007 | Cunha et al. | |
| 2012/0020787 | A1 | 1/2012 | Krückels et al. | |
| 2013/0302176 | A1 | 11/2013 | Bergholz, Jr. et al. | |

FOREIGN PATENT DOCUMENTS

| | | |
|---|---|---|
| JP | 56-18002 | 2/1981 |
| JP | 7-189602 | 7/1995 |
| JP | 09-53405 | 2/1997 |
| JP | 11-270353 | 10/1999 |
| JP | 2004-308659 | 11/2004 |
| JP | 2009-287511 | 12/2009 |
| JP | 2015-512487 | 4/2015 |
| JP | 2015-516539 | 6/2015 |
| WO | 2015/012918 | 1/2015 |

OTHER PUBLICATIONS

Extended European Search Report dated Oct. 22, 2018 in European Application No. 16862182.9.
International Search Report dated Jan. 24, 2017 in International (PCT) Application No. PCT/JP2016/082740.
Written Opinion of the International Searching Authority dated Jan. 24, 2017 in International (PCT) Application No. PCT/JP2016/082740.

* cited by examiner

TURBINE BLADE, GAS TURBINE, INTERMEDIATE PRODUCT OF TURBINE BLADE, AND METHOD OF MANUFACTURING TURBINE BLADE

TECHNICAL FIELD

The present invention relates to a turbine blade used as a stator blade or a rotor blade in a gas turbine, a gas turbine in which this turbine blade is applied, an intermediate product for manufacturing the turbine blade, and a method of manufacturing a turbine blade for manufacturing the turbine blade.

BACKGROUND ART

A typical gas turbine is configured from a compressor, a combustor, and a turbine. Air taken in through an air inlet is compressed by the compressor to produce high-temperature, high-pressure compressed air, to which fuel is supplied and the two are combusted in the combustor to obtain high-temperature, high-pressure combustion gas (operating fluid), which is used to drive the turbine, thereby driving a power generator coupled to the turbine.

In a turbine configured in this way, for example, a stator blade is supported by an outer shroud at a first end portion in the longitudinal direction of the blade body, and is supported by an inner shroud at a second end portion. Cooling air introduced into the blade body from the outer shroud flows along the inner wall surfaces of the blade body to cool the inner wall surfaces of the blade body, and then is discharged to the outside from a cooling hole formed in the blade body and flows along the outer wall surfaces of the blade body to cool the outer wall surfaces of the blade body. Also, the cooling air introduced into the blade body flows along a cooling passage formed in the rear end portion of the blade body and is discharged to the outside, thereby cooling the rear end portion of the blade body.

An example of a gas turbine in which such a stator blade cooling structure is applied is disclosed in JP 2009-287511A. In the turbine stator blade disclosed in JP 2009-287511A, a plurality of cooling pins are disposed in a cooling passage formed in the rear end portion of the blade body, and a plurality of pedestals are arranged at the outlet of the cooling passage to form a nozzle shape. Also, the cooling passage has a tapered shape in which the width becomes narrower toward the outlet.

SUMMARY OF INVENTION

Technical Problem

It is desirable to improve the cooling performance of the blade body of the stator blade, so it is desirable that the width of the cooling passage of the rear end portion is made narrower, and the coefficient of drag (Cd value) is made smaller. Therefore, in the related art, the cooling passage of the blade body has a tapered shape that becomes narrower toward the outlet. However, because the cooling passage of the blade body has a tapered shape, highly accurate processing technology is required in order to properly set the width of the opening of the tip of the outlet, and this has the issue that the processing cost is increased.

The present invention resolves the above-mentioned issue, and it is an object of the present invention to provide a turbine blade, a gas turbine, an intermediate product of a turbine blade, and a method of manufacturing a turbine blade that reduce the resistance of the cooling passage of the rear end portion of the blade and improve the cooling performance of the blade, as well as minimize the increase in manufacturing cost.

Solution to Problems

A turbine blade according to the present invention to achieve the above object includes: a blade body having a hollow shape; a cavity provided in the interior of the blade body; and a cooling passage that is open from the cavity to a rear end portion of the blade body. The cooling passage includes a first passage provided on the cavity side and having a width that becomes narrower from the cavity side toward the rear end portion of the blade body, and a second passage provided on the rear end portion side of the blade body and having a width that is constant from the cavity side toward the rear end portion of the blade body.

Therefore, by providing the first passage in which the width becomes narrower as the cooling passage, the flow rate of cooling air discharged to the outside from the cooling passage can be appropriately adjusted, and by providing the second passage in which the width is constant, continuously from the first passage, the passage resistance can be reduced and the cooling air flow rate can be reduced. As a result, the resistance can be reduced in the cooling passage at the rear end portion of the blade and the cooling performance of the blade can be improved, and also the increase in manufacturing cost can be minimized.

In the turbine blade according to the present invention, a flow rate adjustment mechanism is provided in the second passage.

Therefore, by providing the flow rate adjustment mechanism in the second passage, the flow of the cooling air can be regulated by the flow rate adjustment mechanism so as to be appropriately discharged.

In the turbine blade according to the present invention, the flow rate adjustment mechanism has a plurality of columns provided at predetermined intervals in the second passage of the blade body along a longitudinal direction.

Therefore, the flow rate adjustment mechanism is configured by providing the plurality of columns at predetermined intervals along the longitudinal direction of the second passage, and the structure can be thus simplified.

In the turbine blade according to the present invention, the cooling passage includes a third passage that communicates with the second passage at a first end portion thereof and is open at the rear end portion of the blade body at a second end portion thereof, and that has a constant width from the cavity side toward the rear end portion of the blade body.

Therefore, by providing the third passage having a constant width and communicating with the second passage so as to open at the rear end portion, the cooling air that has passed through the second passage can be appropriately discharged without pressure loss.

In the turbine blade according to the present invention, a plurality of cooling holes that provide communication between the cavity and the exterior are provided in the blade body.

Therefore, the cooling air discharged to the exterior through the plurality of cooling holes from the cavity flows along the outer wall surfaces of the blade body, and cools the blade body with high efficiency.

In the turbine blade according to the present invention, a partition plate having a plurality of through holes is provided in the cavity with a predetermined gap from an inner wall surface of the blade body.

Therefore, the cooling air from the cavity that has passed through the through holes of the partition plate flows along the inner wall surfaces of the blade body, and cools the blade body with high efficiency.

A gas turbine according to the present invention includes a compressor that compresses air, a combustor that mixes compressed air compressed by the compressor with fuel and causes combustion, and a turbine that obtains rotational power by combustion gas generated by the combustor, and the above-described turbine blade is used as a stator blade of the turbine.

Therefore, the resistance can be reduced in the cooling passage at the rear end portion of the blade and the cooling performance of the blade can be increased, and also the increase in manufacturing cost can be minimized.

An intermediate product of a turbine blade according to the present invention includes: a blade body having a hollow shape; a cavity provided in the interior of the blade body; and a cooling passage that is open from the cavity to a rear end portion of the blade body. The cooling passage includes a first passage provided on the cavity side and having a width that becomes narrower from the cavity side toward the rear end portion of the blade body; a second passage provided on the rear end portion side of the blade body and having a width that is constant from the cavity side toward the rear end portion of the blade body; a flow rate adjustment mechanism provided in the second passage; and a third passage that communicates with the second passage at a first end portion of the third passage and that is open at the rear end portion of the blade body at a second end portion of the third passage.

Therefore, by providing the intermediate product having the second passage with a constant width as the cooling passage, the stator blade of the turbine can be easily manufactured by just finishing the intermediate product.

In the intermediate product of a turbine blade according to the present invention, the flow rate adjustment mechanism has a plurality of columns provided at predetermined intervals in the second passage of the blade body along a longitudinal direction.

Therefore, the flow rate adjustment mechanism is configured by providing the plurality of columns at predetermined intervals along the longitudinal direction of the second passage, and thus the structure can be simplified.

A method of manufacturing a turbine blade according to the present invention includes producing the intermediate product of a turbine blade by casting; and cutting the rear end portion of the blade body in the cast intermediate product.

Therefore, the width of the third passage does not vary even in a case where the rear end portion of the blade body in the cast intermediate product is cut, and high cooling performance can be maintained by the second passage.

Advantageous Effects of Invention

According to the turbine blade, gas turbine, intermediate product of a turbine blade, and method of manufacturing a turbine blade of the present invention, the first passage having a decreasing width and the second passage that continues from the first passage and has a constant width are provided as the cooling passage. Therefore, the resistance can be reduced in the cooling passage at the rear end portion of the blade, the cooling performance of the blade can be improved, and also the increase in manufacturing cost can be minimized.

DESCRIPTION OF EMBODIMENTS

Preferred embodiments of a turbine blade, gas turbine, intermediate product of a turbine blade, and method of manufacturing a turbine blade according to the present invention are described in detail below with reference to the attached drawings. Note that the present invention is not limited by these embodiments, and, when there are a plurality of embodiments, includes combinations of those various embodiments.

Figure 5:
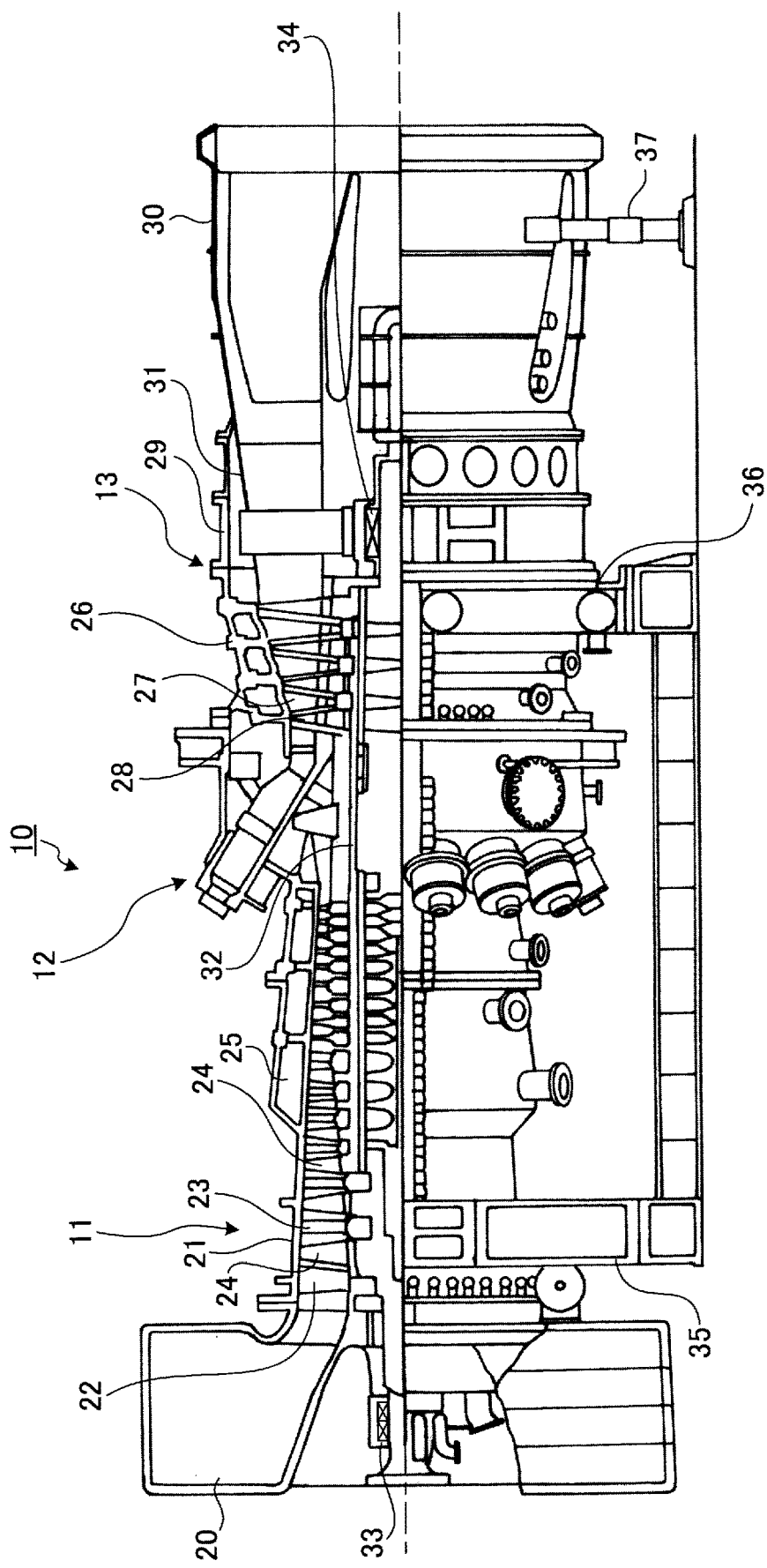
FIG. 5 is a schematic configuration diagram illustrating a gas turbine according to the present embodiment.
Figure 6:
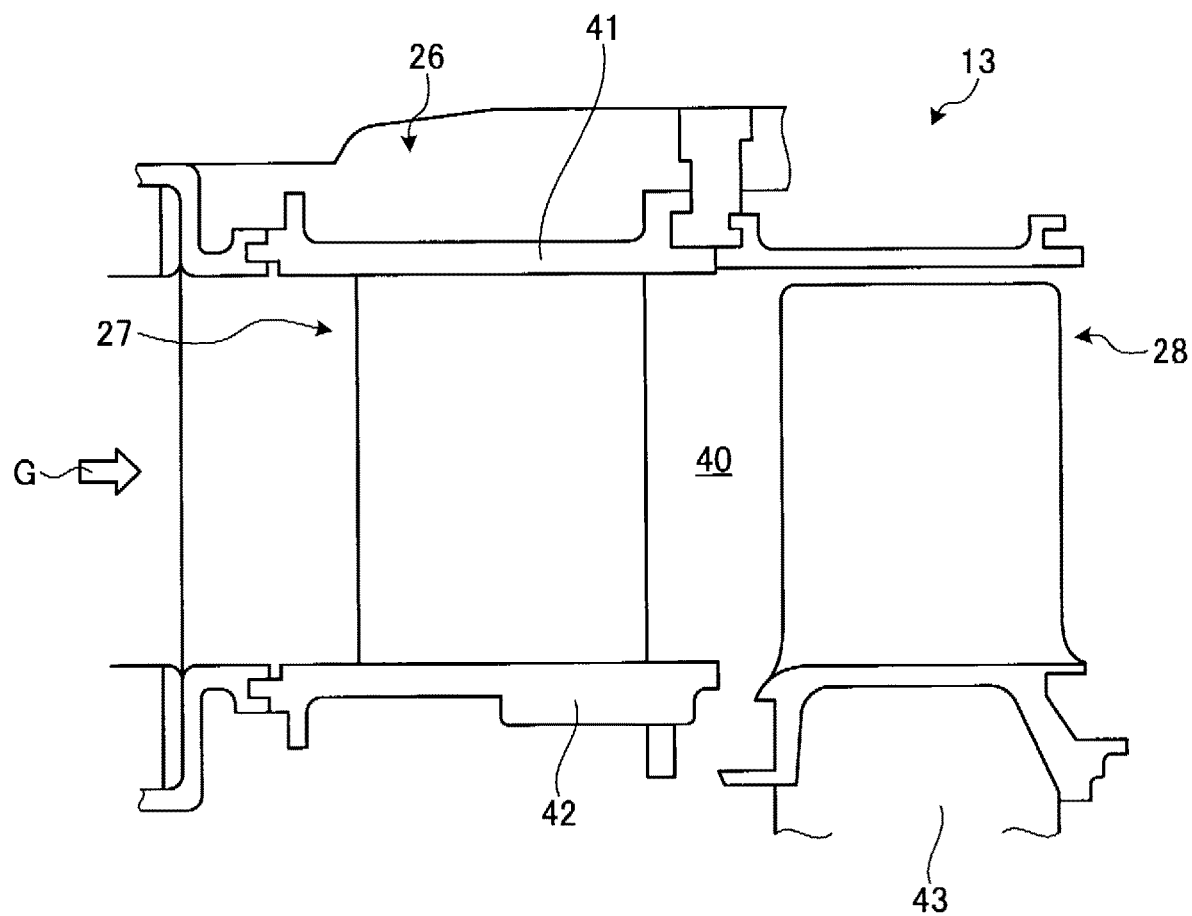
FIG. 6 is a schematic diagram illustrating main parts of a turbine according to the present embodiment.

FIG. 5 is a schematic configuration diagram illustrating a gas turbine according to the present embodiment. FIG. 6 is a schematic diagram illustrating main parts of a turbine according to the present embodiment.

As illustrated in FIG. 5, in the present embodiment, a gas turbine 10 is configured from a compressor 11, combustors 12, and a turbine 13. The gas turbine 10 is coaxially coupled to a generator not illustrated in the drawings, and is capable of generating power.

The compressor 11 includes an air inlet port 20 for taking in air, an inlet guide vane (IGV) 22 disposed inside a compressor casing 21, a plurality of stator blades 23 and rotor blades 24 alternately disposed in the forward/backward direction (the axial direction of a rotor 32 described below) within the compressor casing 21, and an air bleed chamber 25 disposed on the outside of the compressor casing 21. The combustor 12 supplies fuel to compressed air compressed by the compressor 11, and ignites the mixture to allow for combustion. The turbine 13 includes a plurality of stator blades 27 and rotor blades 28 alternately disposed in the forward/backward direction (the axial direction of the rotor 32 described below) within a turbine casing 26. An exhaust chamber 30 is disposed downstream of the turbine casing 26 with an exhaust housing 29 disposed therebetween, and the exhaust chamber 30 includes an exhaust diffuser 31 connected to the turbine 13.

The rotor (rotating shaft) 32 is positioned so as to pass through the centers of the compressor 11, the combustor 12, the turbine 13, and the exhaust chamber 30. The end of the rotor 32 closer to the compressor 11 is rotatably supported by a bearing portion 33, and the end of the rotor 32 closer to the exhaust chamber 30 is rotatably supported by a bearing portion 34. A plurality of discs on which the rotor blades 24 are mounted are anchored in layers to the rotor 32 in the compressor 11, a plurality of discs on which the rotor blades 28 are mounted are anchored in layers thereto in the turbine 13, and the end of the rotor 32 closer to the compressor 11 is connected to a drive shaft of a power generator not illustrated in the drawings.

In the gas turbine 10, the compressor casing 21 of the compressor 11 is supported by a leg 35, the turbine casing 26 of the turbine 13 is supported by a leg 36, and the exhaust chamber 30 is supported by a leg 37.

Accordingly, air taken in through the air inlet port 20 of the compressor 11 passes through the inlet guide vane 22 and the plurality of stator blades 23 and rotor blades 24 and is compressed, and the air is converted to high-temperature, high-pressure compressed air. A predetermined fuel is supplied into the compressed air in the combustors 12 and combusted. High-temperature, high-pressure combustion gas, which is the working fluid produced by the combustors 12, passes through the plurality of stator blades 27 and rotor blades 28 making up the turbine 13, thereby driving the rotation of the rotor 32 and, in turn, driving the power generator connected to the rotor 32. The combustion gas that has driven the turbine 13 is released to the atmosphere as exhaust gas.

As illustrated in FIG. 6, in the turbine 13 described above, the turbine casing 26 with a cylindrical shape is provided with a combustion gas passage 40 with a ring shape through which combustion gas G flows. The plurality of stator blades 27 and rotor blades 28 are disposed in the combustion gas passage 40 at predetermined intervals in a circumferential direction, and are disposed alternately in the flow direction of the combustion gas G In a longitudinal direction of the stator blade 27 (radial direction of the rotor 32), an outer shroud 41 is fixed to a first end (the outside in the radial direction) of the stator blade 27, and an inner shroud 42 is fixed to a second end (the inside in the radial direction) of the stator blade 27. The outer shroud 41 is supported by the turbine casing 26. In a longitudinal direction of the rotor blade 28 (radial direction of the rotor 32), a platform 43 is fixed to a base end portion (the inside in the radial direction) of the rotor blade 28. The platform 43 is fixed to the rotor 32 via the disc, and the tip (the outside in the radial direction) extends to close to the inner wall surface of the turbine casing 26.

Figure 1:
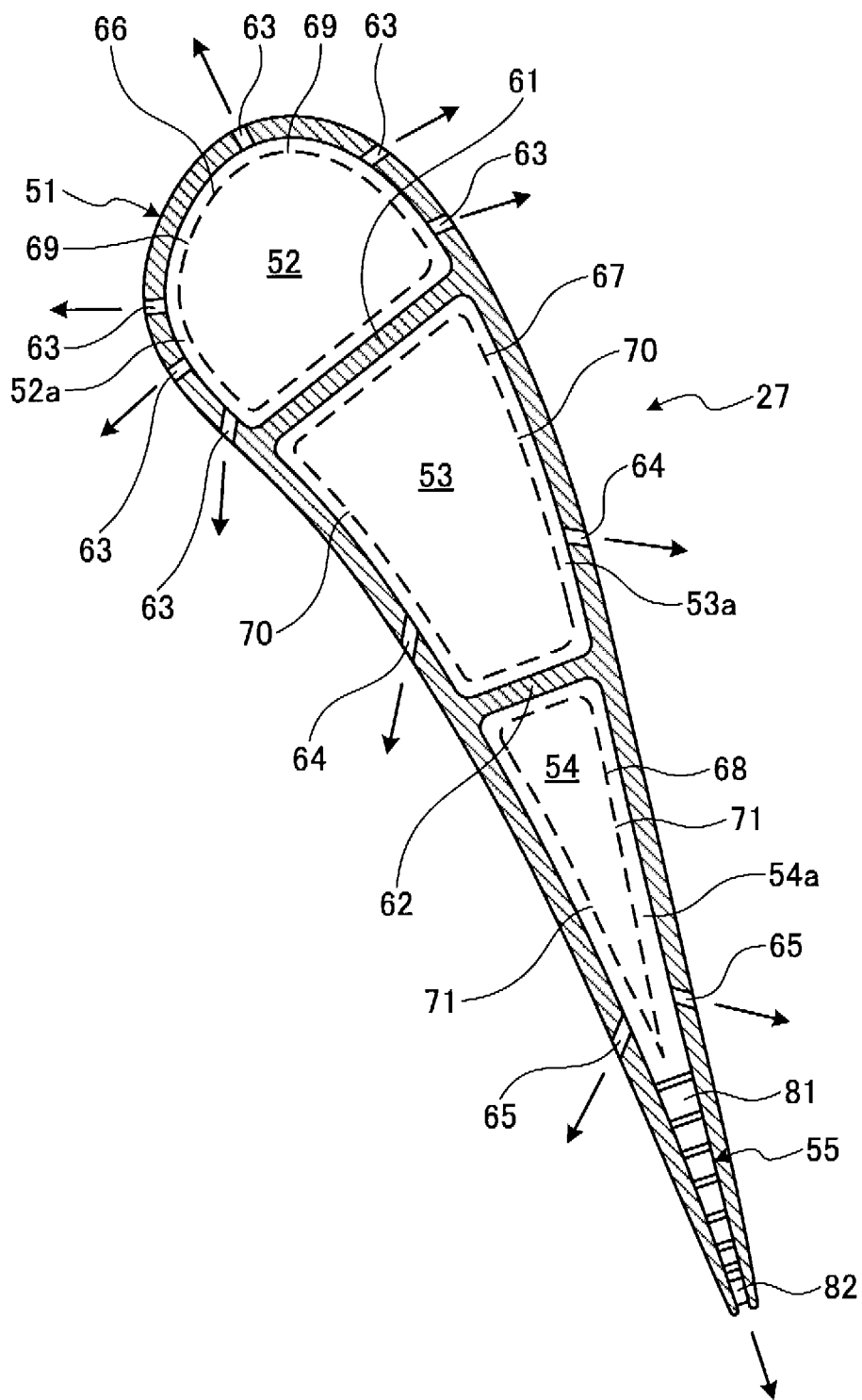
FIG. 1 is a cross-sectional view illustrating a turbine stator blade according to the present embodiment.
Figure 2:
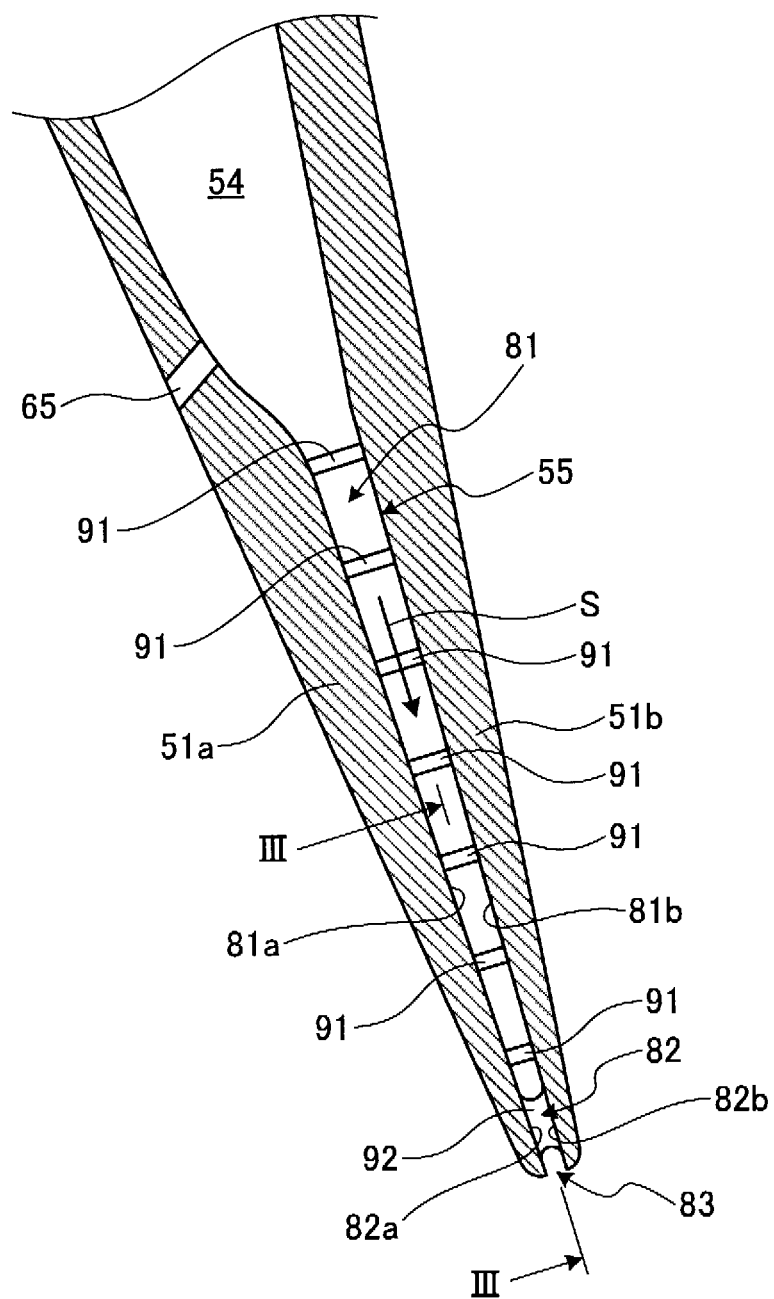
FIG. 2 is a cross-sectional view illustrating a rear end portion of a turbine blade.
Figure 3:
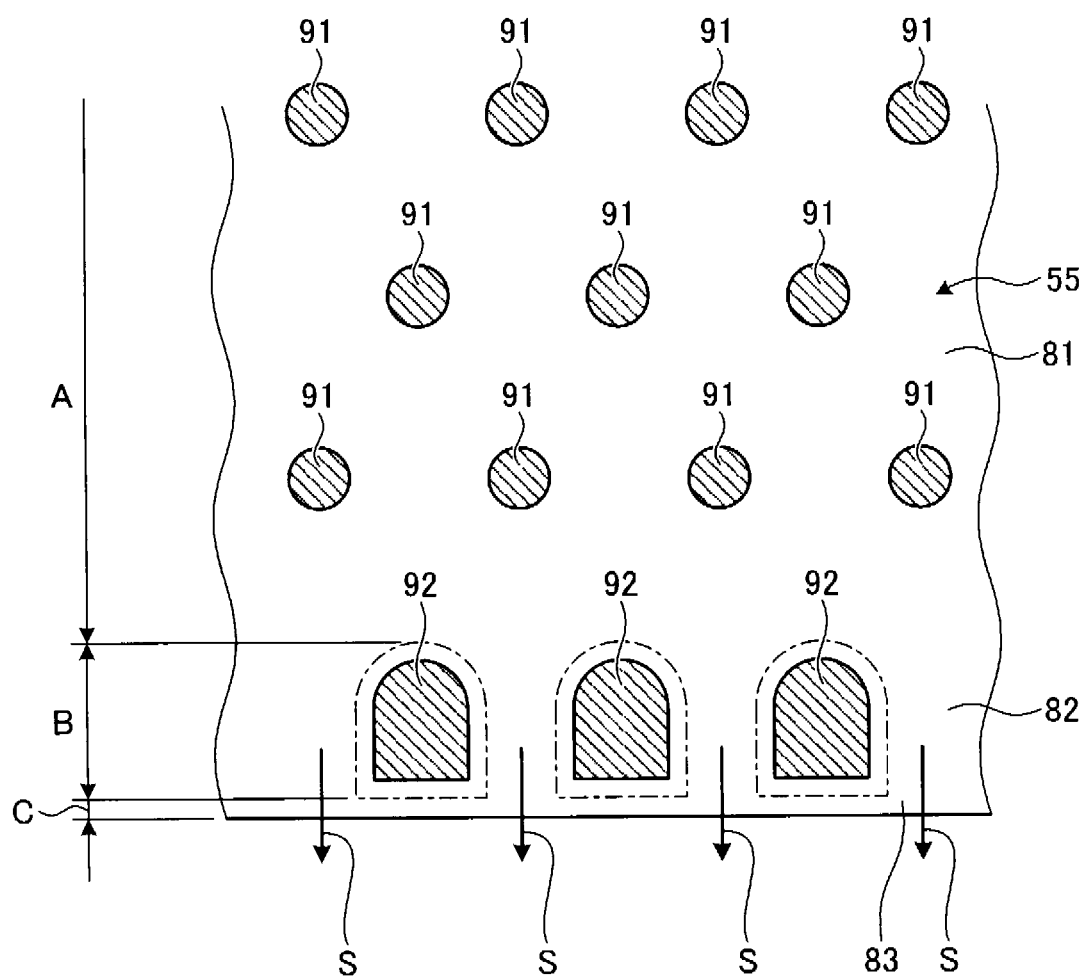
FIG. 3 is a cross-sectional view illustrating a cooling passage of the turbine blade, taken along the line in FIG. 2.
Figure 4:
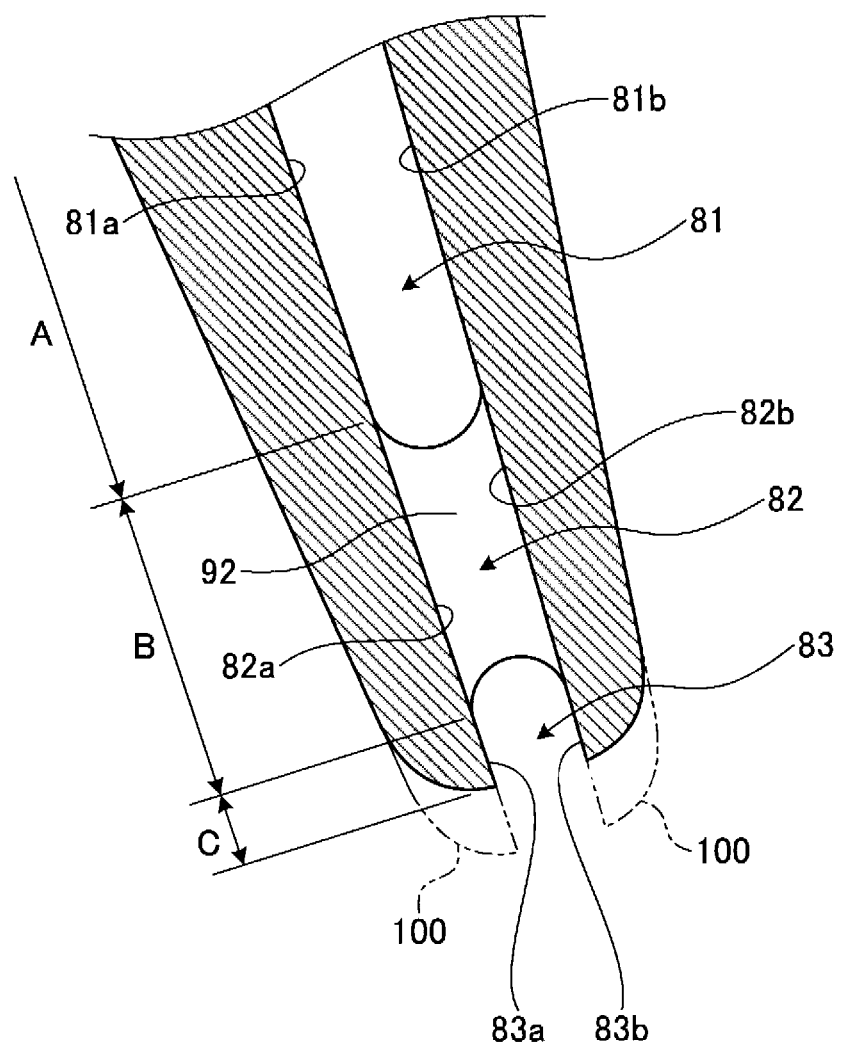
FIG. 4 is a cross-sectional view illustrating an outlet of the cooling passage in the turbine blade.

The following is a detailed description of the stator blade 27 that constitutes the turbine blade according to the present invention. FIG. 1 is a cross-sectional view illustrating a turbine stator blade according to the present embodiment; FIG. 2 is a cross-sectional view of the rear end portion of a turbine blade; FIG. 3 is a cross-sectional view illustrating a cooling passage of the turbine blade, taken along the line in FIG. 2; and FIG. 4 is a cross-sectional view illustrating an outlet of the cooling passage in the turbine blade.

In the present embodiment, the stator blade 27 includes a blade body 51, cavities 52, 53, 54, and a cooling passage 55, as illustrated in FIG. 1.

The blade body 51 has a hollow shape, and has a curved cross-sectional shape at the front end portion thereof that is on the upstream side (the top side in FIG. 1) in a flow direction of combustion gas, and has a tapered cross-sectional shape at the rear end portion thereof that is on the downstream side (the bottom side in FIG. 1) in the flow direction of the combustion gas. The interior of the blade body 51 is partitioned into the three cavities 52, 53, 54 by two partition walls 61, 62. A first cavity 52 is disposed at the front end portion side of the blade body 51, a third cavity 54 is disposed at the rear end portion side of the blade body 51, and a second cavity 53 is disposed between the first cavity 52 and the third cavity 54. Also, a plurality of cooling holes 63, 64, 65 that pass from the interior to the exterior of the blade body 51 are formed at predetermined locations corresponding to the cavities 52, 53, 54 respectively.

Partition plates 66, 67, 68 are disposed on the inside of the blade body 51 corresponding to the cavities 52, 53, 54. The partition plates 66, 67, 68 have a tubular shape, and each end portion in a longitudinal direction is fixed to the blade body 51 or the shrouds 41, 42. Each of the partition plates 66, 67, 68 is disposed with a predetermined gap from the inner wall surface of the blade body 51, so that cooling spaces 52a, 53a, 54a are partitioned around the peripheries of the cavities 52, 53, 54. Also, a plurality of through holes 69, 70, 71 are formed in the partition plates 66, 67, 68, so that the cooling spaces 52a, 53a, 54a communicate with the cavities 52, 53, 54 via the through holes 69, 70, 71.

The cooling passage 55 opens from the third cavity 54 to the rear end portion of the blade body 51. The cooling passage 55 includes a first passage 81 and a second passage 82. The first passage 81 is provided on the third cavity 54 side, and a width of the first passage 81 becomes narrower from the third cavity 54 side toward the rear end portion of the blade body 51. The second passage 82 is provided on the rear end portion side of the blade body 51, and a width of the second passage 82 is constant from the third cavity 54 side toward the rear end portion of the blade body 51.

As illustrated in FIG. 2 to FIG. 4, a base end portion of the first passage 81 communicates with the third cavity 54, a tip portion of the first passage 81 extends toward the rear end portion of the blade body 51, and the width of the first passage 81 is configured to become narrower. In other words, the first passage 81 is a passage partitioned by a pressure-side wall portion 51a and a suction-side wall portion 51b forming the blade body 51, and is formed by opposing wall surfaces 81a, 81b. The width between the wall surfaces 81a, 81b becomes narrower toward the downstream side in the flow direction of cooling air S. Also, a plurality of cooling pins 91 are provided at predetermined intervals in the first passage 81, to provide a pin fin cooling structure. Each of the cooling pins 91 is fixed so as to connect the wall surfaces 81a, 81b of the wall portions 51a, 51b of the blade body 51, and the cooling pins 91 are arranged so as to intersect with the flow direction of the cooling air S flowing through the first passage 81. Also, the cooling pins 91 are disposed to form a staggered lattice in the first passage 81.

The second passage 82 is provided with a flow rate adjustment mechanism, and the flow rate adjustment mechanism is configured by providing a plurality of columns at predetermined intervals along the longitudinal direction in the second passage 82. In other words, a base end portion of the second passage 82 communicates with the first passage 81, a tip portion of the second passage 82 extends toward the rear end portion of the blade body 51, and the width of the second passage 82 is configured to be constant. In other words, the second passage 82 is a passage partitioned by the pressure-side wall portion 51a and the suction-side wall portion 51b forming the blade body 51, and is formed by opposing wall surfaces 82a, 82b. The wall surfaces 82a, 82b are parallel in the flow direction of the cooling air S, and the width therebetween is constant. Also, the second passage 82 has a nozzle cooling structure that is formed by providing a plurality of pedestals 92 having a column shape at predetermined intervals along a longitudinal direction of the blade body 51 (the horizontal direction in FIG. 3). Each of the pedestals 92 is fixed so as to connect the wall surfaces 82a, 82b of the wall portions 51a, 51b of the blade body 51, and the pedestals 92 are arranged so as to intersect with the flow direction of the cooling air S flowing through the second passage 82.

The side surfaces of each of the pedestals 92 facing the adjacent pedestals 92 are flat surfaces along the flow direction of the cooling air S. The side surface of each of the pedestals 92 on the upstream side in the flow direction of the cooling air S has a semicircular shape that is convex toward the upstream side, and the side surface thereof on the downstream side in the flow direction of the cooling air S is a flat surface that is orthogonal to the flow direction of the cooling air S. Also, side portions of each of the pedestals 92 are smoothly connected to the wall surfaces 82a, 82b in a circular arc shape so that there is no step.

Also, the cooling passage 55 includes a third passage 83. A base end portion of the third passage 83 communicates with the second passage 82, a tip portion of the third passage 83 is open at the rear end portion of the blade body 51, and the width of the third passage 83 is configured to be constant from the third cavity 54 side toward the rear end portion of the blade body 51. In other words, the third passage 83 is a passage partitioned by the pressure-side wall portion 51a and the suction-side wall portion 51b forming the blade body 51, and is formed by opposing wall surfaces 83a, 83b. The wall surfaces 83a, 83b are parallel in the flow direction of the cooling air S, and the width therebetween is constant.

In other words, the first passage 81 is a passage of which the width becomes narrower from the third cavity 54 side toward the rear end portion of the blade body 51, and is provided in a region A. The second passage 82 is a passage of which the width is constant from the first passage 81 toward the rear end portion of the blade body 51, and is provided in a region B. Here, the wall surfaces 81a, 81b of the first passage 81 are curved along the flow direction of the cooling air S, and the first passage 81 (wall surfaces 81a, 81b) and the second passage 82 (wall surfaces 82a, 82b) are connected without a step. The boundary between the first passage 81 (region A) and the second passage 82 (region B) is the point of contact between the wall surfaces 81a, 81b and the side surfaces of the pedestals 92 having the circular arc shape. The third passage 83 is a passage of which the width is constant from the second passage 82 toward the rear end portion of the blade body 51, and is provided in a region C. Here, the wall surfaces 82a, 82b of the second passage 82 and the wall surfaces 83a, 83b of the third passage 83 are flat surfaces that are parallel along the flow direction of the cooling air S, and the second passage 82 (wall surfaces 82a, 82b) and the third passage 83 (wall surfaces 83a, 83b) are connected without a step. The boundary between the second passage 82 (region B) and the third passage 83 (region C) is the point of contact between the wall surfaces 83a, 83b and the side surfaces of the pedestals 92 having the circular arc shape.

The stator blade 27 configured in this way is manufactured as a casting by a casting process, and a finishing treatment is performed on the outer surface by machining. Specifically, an intermediate product having the blade body 51, the cavities 52, 53, 54, and the cooling passage 55 is manufactured using a mold and a core that are not illustrated in the drawings, and cutting is carried out on the rear end portion of the blade body 51 of the intermediate product produced. More specifically, a portion to be removed 100 is removed by a cutting process from the rear end portion of the blade body 51 in the intermediate product produced, as illustrated in FIG. 4. As a result of this operation, a total length of the stator blade 27 is finished to the prescribed length. In this case, the width of the third passage 83 in the cooling passage 55 is constant in the flow direction of the cooling air S. Therefore, the thickness of the core for producing the cooling passage 55 does not become smaller, and, even in a case where there is variation in the length removed of the portion to be removed 100, there is no variation in the width of the third passage 83.

Next, the operation of the stator blade 27 of the present embodiment will be described.

As illustrated in FIG. 1, when cooling air (cooling medium) from a cooling passage that is not illustrated in the drawings is supplied to the stator blade 27 from the outer shroud 41, first, the cooling air is introduced into each of the cavities 52, 53, 54 on the inside of the respective partition plates 66, 67, 68. Then, the cooling air inside the cavities 52, 53, 54 next is injected through the large number of through holes 69, 70, 71 formed in the partition plates 66, 67, 68 into the cooling spaces 52a, 53a, 54a, where the cooling air flows along the inner wall surfaces of the blade body 51 and thereby performs impingement cooling thereon.

Thereafter, the cooling air in the cooling spaces 52a, 53a, 54a is discharged through the large number of cooling holes 63, 64, 65 to the outside (the combustion gas passage 40). The cooling air flows along the outer wall surface of the blade body 51, thereby cooling the outer wall surface. Also, a portion of the cooling air in the cooling space 54a cools the rear end portion of the blade body 51 by passing through the cooling passage 55 and being discharged from the rear end portion. At this time, when the cooling air from the cooling space 54a flows through the first passage 81 that has a tapered shape, the flow rate of the cooling air is adjusted, and the cooling efficiency is increased as the cooling air flows in a curved manner while contacting the plurality of cooling pins 91. Then, when the cooling air that has passed through the first passage 81 flows through the second passage 82 and the third passage 83 in which the width is constant, the cooling air passes between each of the pedestals 92, so that the coefficient of drag (Cd value) is reduced and the rear end portion of the blade body 51 is cooled with a low air flow rate.

In this way, the turbine blade according to the present embodiment includes: the blade body 51 having a hollow shape; the cavities 52, 53, 54 provided in the interior of the blade body 51; and the cooling passage 55 that opens from the cavities 52, 53, 54 to the rear end portion of the blade body 51. The first passage 81 provided on the third cavity 54 side and having a width that becomes narrower from the third cavity 54 side toward the rear end portion of the blade body 51, and the second passage 82 provided on the rear end portion side of the blade body 51 and having a width that is constant from the third cavity 54 side toward the rear end portion of the blade body 51 are provided as the cooling passage 55.

Therefore, by providing the first passage 81 in which the width becomes narrower as the cooling passage 55, the flow rate of cooling air discharged to the outside from the cooling passage 55 can be appropriately adjusted, and by providing the second passage 82 in which the width is constant, continuously from the first passage 81, the passage resistance can be reduced and the cooling air flow rate can be reduced. As a result, the resistance can be reduced in the cooling passage 55 at the rear end portion of the blade body 51 and the cooling performance of the stator blade 27 can be improved, and also the increase in manufacturing cost can be minimized.

In the turbine blade according to the present embodiment, the plurality of cooling pins 91 are provided in the first passage 81 at predetermined intervals, and the plurality of pedestals 92 are provided in the second passage 82 along the longitudinal direction of the blade body 51, at predetermined intervals. Therefore, by providing the plurality of cooling pins 91 in the first passage 82 and the plurality of pedestals 92 in the second passage 82, the cooling efficiency of the blade body 51 can be improved by the plurality of cooling pins 91, and the flow of the cooling air can be regulated by the plurality of pedestals 92 so as to be appropriately discharged. In other words, by forming the region B, where the pedestals 92 are provided, as the second passage 82 with a constant width, the flow rate of the cooling air flowing through the cooling passage 55 is reduced and the rear end portion of the blade body 51 can be cooled with high efficiency.

In the turbine blade according to the present embodiment, the third passage 83 is provided as the cooling passage 55. The third passage 83 has the first end portion communicating with the second passage 82 and the second end portion being open at the rear end portion of the blade body 51, and has a constant width from the third cavity 54 side toward the rear end portion of the blade body 51. Therefore, by providing the third passage 83 having a constant width and communicating with the second passage 82 so as to open at the rear end portion, the cooling air that has passed through the second passage 82 can be appropriately discharged without pressure loss.

In the turbine blade according to the present embodiment, the plurality of cooling holes 63, 64, 65 that provide communication between the cavities 52, 53, 54 and the exterior are provided in the blade body 51. Therefore, the cooling air discharged to the exterior through the plurality of cooling holes 63, 64, 65 from the cavities 52, 53, 54 flows along the outer wall surfaces of the blade body 51, and cools the blade body 51 with high efficiency.

In the turbine blade according to the present embodiment, the partition plates 66, 67, 68 having the plurality of through holes 69, 70, 71 are provided in the cavities 52, 53, 54 with a predetermined gap from the inner wall surfaces of the blade body 51. Therefore, the cooling air from the cavities 52, 53, 54 that has passed through the through holes 69, 70, 71 of the partition plates 66, 67, 68 flows along the inner wall surfaces of the blade body 51, and cools the blade body 51 with high efficiency.

The gas turbine according to the present embodiment includes the compressor 11 that compresses air, the combustors 12 that mix the compressed air compressed by the compressor 11 with fuel and cause combustion, and the turbine 13 that obtains the rotational power by the combustion gas generated by the combustors 12, and the stator blade 27 is used in the turbine 13. Therefore, the resistance can be reduced in the cooling passage 55 at the rear end portion of the blade body 51, the cooling performance of the stator blade 27 can be improved, and also the increase in manufacturing cost can be minimized.

The intermediate product of a turbine blade according to the present embodiment includes, as the cooling passage 55 provided in the blade body 51: the first passage 81 whose width becomes narrower; the second passage 82 having a constant width; the plurality of pedestals 92 of the second passage 82; and the third passage 83 that communicates with the second passage 82 and that is open at the rear end portion of the blade body 51. Therefore, the stator blade 27 of the turbine 13 can be easily manufactured by just finishing the intermediate product.

The method of manufacturing a turbine blade according to the present embodiment includes: producing the intermediate product of the stator blade 27 by casting; and cutting the rear end portion of the blade body 51 in the cast intermediate product. Therefore, the width of the third passage does not vary even if the rear end portion of the blade body 51 in the cast intermediate product is cut, and high cooling performance can be maintained by the second passage 82.

Note that the boundary between the first passage 81 (region A) and the second passage 82 (region B) in the present embodiment is the point of contact between the wall surfaces 81a, 81b and the side surfaces of the pedestals 92 having the circular arc shape, but the boundary may be on the third cavity 54 side of the point of contact. In other words, the second passage 82 may extend to the upstream side in the flow direction of the cooling air S.

Also, in the embodiment as described above, the third passage 83 having a constant width is provided as the cooling passage 55, but the width of the third passage may increase from the third cavity 54 side toward the rear end portion of the blade body 51.

Also, in the embodiment as described above, an outlet (nozzle) of the cooling air S is formed by disposing the plurality of pedestals 92 in the second passage 82 of the blade body 51, but a plurality of outlet holes may be disposed in parallel in the rear end portion of the blade body 51, and the first passage 81 and the second passage 82 may be formed on the inside of the outlet holes.

Also, in the embodiment as described above, the turbine blade according to the present invention is applied to the stator blades 27 of the turbine 13, but it may also be applied to the rotor blades 28.

REFERENCE SIGNS LIST

10 Gas turbine
11 Compressor
12 Combustor
13 Turbine
27 Stator blade
28 Rotor blade
41 Outer shroud
42 Inner shroud
51 Blade body
52, 53, 54 Cavity
52a, 53a, 54a Cooling space
55 Cooling passage
61, 62 Partition wall
63, 64, 65 Cooling hole
66, 67, 68 Partition plate
69, 70, 71 Through hole
81 First passage
81a, 81b Wall surface
82 Second passage
82a, 82b Wall surface
83 Third passage
83a, 83b Wall surface
91 Cooling pin
92 Pedestal
G Combustion gas
S Cooling air

The invention claimed is:

1. A turbine blade, comprising:
a blade body having a hollow shape;
a cavity defined in an interior of the blade body; and
a cooling passage that is open from the cavity to a rear end portion of the blade body, the rear end portion of the blade body being on a downstream side in a flow direction of a combustion gas in a mounted state of the turbine blade,
wherein:
the cooling passage includes a first passage, a second passage, a third passage, each of the first passage, the second passage and the third passage being partitioned by a pressure-side wall portion and a suction-side wall portion defining the blade body, and the first passage, the second passage and the third passage defining a flow direction for cooling air from the cavity to the rear end portion of the blade body;

the first passage has a base end portion being in communication with the cavity and a tip portion extending toward the rear end portion of the blade body, the first passage having a width between the pressure-side wall portion and the suction-side wall portion that becomes narrower from the base end portion of the first passage toward the rear end portion of the blade body;

cooling pins are provided at intervals in the first passage;

the second passage has a base end portion being in communication with the first passage and a tip portion extending toward the rear end portion of the blade body, the second passage having a constant width between the pressure-side wall portion and the suction-side wall portion from the base end portion of the second passage toward the rear end portion of the blade body, the second passage has a nozzle cooling structure defined by a plurality of pedestals having a column shape at intervals along a longitudinal direction of the blade body;

the third passage has a base end portion being in communication with the second passage and a tip portion opening at the rear end portion of the blade body, the third passage having a constant width between the pressure-side wall portion and the suction-side wall portion from the base end portion of the third passage toward the rear end portion of the blade body; and side surfaces of each of the pedestals facing the adjacent pedestals are linear along the flow direction for the cooling air.

2. The turbine blade according to claim 1, wherein a plurality of cooling holes are defined in the blade body and provide communication between the cavity and an exterior surface of the blade body.

3. The turbine blade according to claim 2, wherein a partition plate having a plurality of through holes is provided in the cavity with a gap from an inner wall surface of the blade body.

4. A gas turbine, comprising:

a compressor configured to compress air;

a combustor configured to mix compressed air compressed by the compressor with fuel and cause combustion; and a turbine configured to obtain rotational power by combustion gas generated by the combustor, wherein the turbine blade according to claim 1 is a stator blade of the turbine.

5. A method of manufacturing a turbine blade according to claim 1, the method comprising:

producing the turbine blade by casting to form a cast intermediate product of the turbine blade; and cutting the rear end portion of the blade body in the cast intermediate product to remove a portion from the rear end portion of the blade body while retaining a length of the third passage having the constant width.

* * * * *